United States Patent
Sollars et al.

(10) Patent No.: US 6,205,669 B1
(45) Date of Patent: Mar. 27, 2001

(54) WALL HANGING LEVEL

(76) Inventors: Dennis R. Sollars, 10824 Rimbey Ct., Glen Allen, VA (US) 23060; Truly G. Hammock, Jr., 6001 Belrun Pl., Richmond, VA (US) 23234

( * ) Notice: Subject to any disclaimer, the term of this patent is extended or adjusted under 35 U.S.C. 154(b) by 0 days.

(21) Appl. No.: 09/244,394

(22) Filed: Feb. 4, 1999

(51) Int. Cl.[7] .................................. G01C 9/02; G01D 21/00
(52) U.S. Cl. ........................................ 33/371; 33/613
(58) Field of Search .............................. 33/333, 374, 376, 33/379, 380, 384, 809, 347, 370, 371, 613, 645

(56) References Cited

U.S. PATENT DOCUMENTS

| | | | |
|---|---|---|---|
| 4,241,510 | * 12/1980 | Radecki | 33/180 R |
| 4,443,949 | * 4/1984 | Newton | 33/180 R |
| 4,944,094 | * 7/1990 | Depiano et al. | 33/371 |
| 5,588,217 | * 12/1996 | Lindner et al. | 33/379 |
| 5,802,729 | * 9/1998 | O'Brien et al. | 33/371 |
| 5,867,917 | * 2/1999 | Karon | 33/613 |
| 6,032,378 | * 3/2000 | Null | 33/613 |

* cited by examiner

Primary Examiner—G. Bradley Bennett
Assistant Examiner—Gail Verbitsky

(57) ABSTRACT

A wall hanging level for assisting a user in determining whether a wall hanging is horizontally aligned properly on a vertical wall surface. The wall hanging level includes a case with an elongate slot extending along a lower edge of the case. A panel is slidably inserted into the elongate slot of the case. A front face of the panel has a bubble vial.

11 Claims, 2 Drawing Sheets

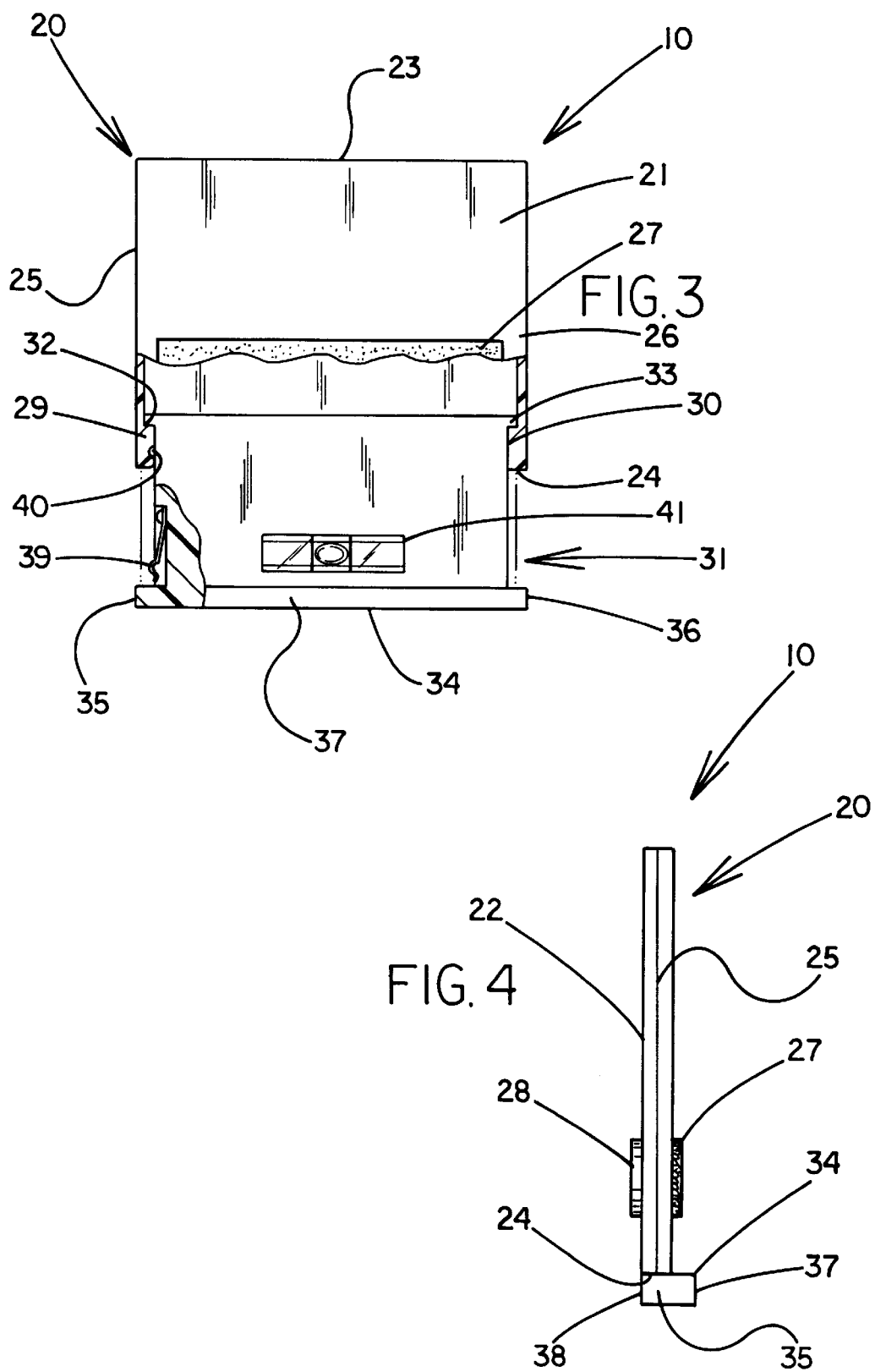

WALL HANGING LEVEL

BACKGROUND OF THE INVENTION

1. Field of the Invention

The present invention relates to levels and more particularly pertains to a new wall hanging level for assisting a user in determining whether a wall hanging is horizontally aligned properly on a vertical wall surface.

2. Description of the Prior Art

The use of levels is known in the prior art. More specifically, levels heretofore devised and utilized are known to consist basically of familiar, expected and obvious structural configurations, notwithstanding the myriad of designs encompassed by the crowded prior art which have been developed for the fulfillment of countless objectives and requirements.

Known prior art includes U.S. Pat. No. 4,208,802 by Berndt; U.S. Pat. No. 4,944,094 by Depiano et al.; U.S. Pat. No. Des. 368,666 by Fonte; U.S. Pat. No. 2,356,311 by Geier; U.S. Pat. No. 4,100,681 by Hollander; and U.S. Pat. No. Des. 282,054 by Hoffman.

While these devices fulfill their respective, particular objectives and requirements, the aforementioned patents do not disclose a new wall hanging level. The inventive device includes a case with an elongate slot extending along a lower edge of the case. A panel is slidably inserted into the elongate slot of the case. A front face of the panel has a bubble vial.

In these respects, the wall hanging level according to the present invention substantially departs from the conventional concepts and designs of the prior art, and in so doing provides an apparatus primarily developed for the purpose of assisting a user in determining whether a wall hanging is horizontally aligned properly on a vertical wall surface.

SUMMARY OF THE INVENTION

In view of the foregoing disadvantages inherent in the known types of levels now present in the prior art, the present invention provides a new wall hanging level construction wherein the same can be utilized for assisting a user in determining whether a wall hanging is horizontally aligned properly on a vertical wall surface.

The general purpose of the present invention, which will be described subsequently in greater detail, is to provide a new wall hanging level apparatus and method which has many of the advantages of the levels mentioned heretofore and many novel features that result in a new wall hanging level which is not anticipated, rendered obvious, suggested, or even implied by any of the prior art levels, either alone or in any combination thereof.

To attain this, the present invention generally comprises a case with an elongate slot extending along a lower edge of the case. A panel is slidably inserted into the elongate slot of the case. A front face of the panel has a bubble vial.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new wall hanging level apparatus and method which has many of the advantages of the levels mentioned heretofore and many novel features that result in a new wall hanging level which is not anticipated, rendered obvious, suggested, or even implied by any of the prior art levels, either alone or in any combination thereof.

It is another object of the present invention to provide a new wall hanging level which may be easily and efficiently manufactured and marketed.

It is a further object of the present invention to provide a new wall hanging level which is of a durable and reliable construction.

An even further object of the present invention is to provide a new wall hanging level which is susceptible of a low cost of manufacture with regard to both materials and labor, and which accordingly is then susceptible of low prices of sale to the consuming public, thereby making such wall hanging level economically available to the buying public.

Still yet another object of the present invention is to provide a new wall hanging level which provides in the apparatuses and methods of the prior art some of the advantages thereof, while simultaneously overcoming some of the disadvantages normally associated therewith.

Still another object of the present invention is to provide a new wall hanging level for assisting a user in determining whether a wall hanging is horizontally aligned properly on a vertical wall surface.

Yet another object of the present invention is to provide a new wall hanging level which includes a case with an elongate slot extending along a lower edge of the case. A panel is slidably inserted into the elongate slot of the case. A front face of the panel has a bubble vial.

Still yet another object of the present invention is to provide a new wall hanging level that is mountable to the back of a wall hanging so that it may be used any time after the wall hanging has been hung to determine whether the wall hanging is horizontally level.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be made to the accompanying drawings and descriptive matter in which there are illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 3 is a schematic partial cross-sectional view of the present invention.

FIG. 4 is a schematic side view of a preferred embodiment of the present invention.

DESCRIPTION OF THE PREFERRED EMBODIMENT

Figure 1:
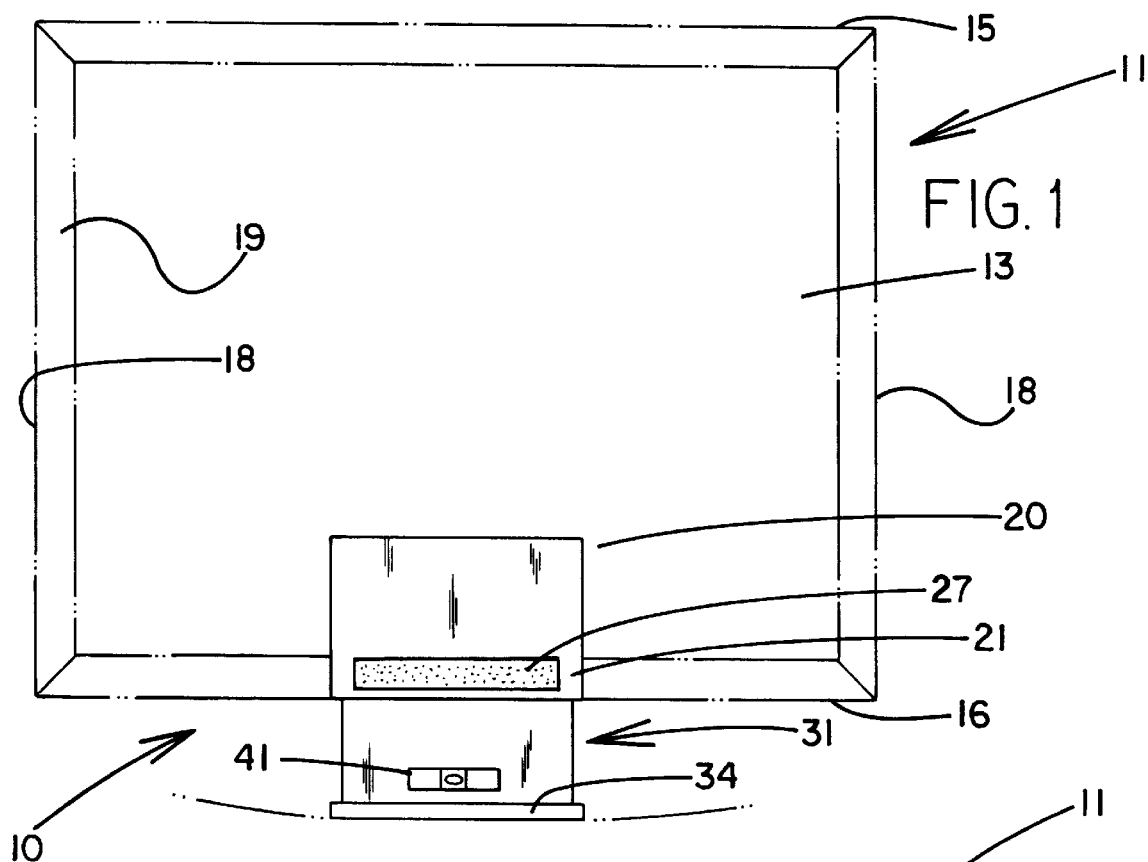
FIG. 1 is a schematic front view of a new wall hanging level according to the present invention with the wall hanging shown in phantom lines.
Figure 2:
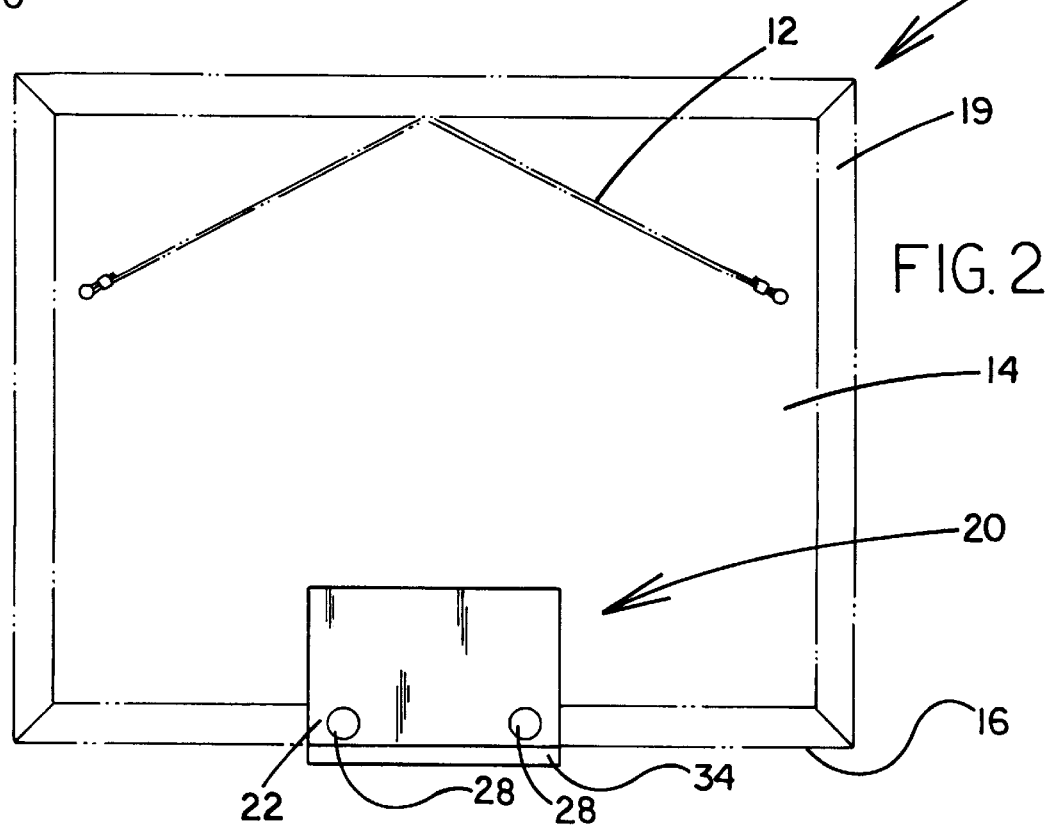
FIG. 2 is a schematic back view of the present invention with the wall hanging shown in phantom lines.

With reference now to the drawings, and in particular to FIGS. 1 through 4 thereof, a new wall hanging level embodying the principles and concepts of the present invention and generally designated by the reference numeral 10 will be described.

As best illustrated in FIGS. 1 through 4, the wall hanging level 10 generally comprises a case with an elongate slot extending along a lower edge of the case. A panel is slidably inserted into the elongate slot of the case. A front face of the panel has a bubble vial.

In use, the level 10 is designed for determining whether a wall hanging 11 (such as a picture) hanging (by, for example, a mounting wire 12) from a vertical supporting surface (such as a wall surface) is horizontally level. The wall hanging is preferably (but not limited to) generally rectangular and has a generally rectangular outer perimeter, and front and back faces 13,14. The back face of the wall hanging is substantially planar. The outer perimeter of the wall hanging comprises substantially straight top and bottom edges 15,16 and a pair of substantially straight side edges 17,18 extending between the top and bottom edges of the wall hanging. The top and bottom edges of the wall hanging are extended substantially parallel to one another. The side edges of the wall hanging is extended substantially parallel to one another and substantially perpendicular to the top and bottom edges of the wall hanging. The wall hanging may preferably also have a frame 19 extending around the outer perimeter of the wall hanging.

In closer detail, the level comprises a generally rectangular case 20 having substantially planar front and back faces 21,22, substantially straight upper and lower edges 22,23, and a pair of substantially straight side edges 24,25 extending between the upper and lower edges of the case. The front and back faces of the case lie in substantially parallel planes to one another. The upper and lower edges of the case are extended substantially parallel to one another. The side edges of the case are preferably extended substantially parallel to one another and substantially perpendicular to the upper and lower edges of the case. The case has a height defined between the upper and lower edges of the case, a width defined between the side edges of the case and a thickness defined between the front and back faces of the case. In an ideal illustrative embodiment, the case is about credit card size so that the height of the case is about 2½ inches, the width of the case is about 3½ inches and the thickness of the case is about ⅛ inch.

The front face of the case is coupled to the back face of the wall hanging towards the bottom edge of the wall hanging such that the case is positioned between the wall hanging and the vertical supporting surface. Preferably, for added strength, the front face of the case is coupled to the back face of the wall hanging at a portion of the frame of the wall hanging located along the bottom edge of the wall hanging. Ideally, a hook and loop fastener couples the front face of the case to the back face of the wall hanging. The hook and loop fastener has a pair of complementary portions (i.e., a hooks portion and a loops portion) attachable to one another. One of the complementary portions 27 of the hook and loop fastener is provided on a generally rectangular elongate patch on the front face of the case has a longitudinal axis extending between the side edges of the case substantially parallel to the upper and lower edges of the case. The other of the complementary portions of the hook and loop fastener is provided on the back face of the wall hanging at the portion of the frame of the wall hanging along the bottom edge of the wall hanging.

Preferably, a spaced apart pair of generally disk-shaped pads 28 are coupled to the back face of the case. The pads abut the vertical supporting surface. In one preferred embodiment, the pads each comprises a resiliently deformable material such as a resiliently deformable rubber or plastic for frictionally enhancing contact between the pads and the vertical supporting surface. In a second preferred embodiment, the pads each comprises magnetic material for magnetically coupling the pads to a magnetizable vertical supporting surface. In a third preferred embodiment, the pads each have a pin outwardly extending therefrom for inserting into the vertical supporting surface. In a fourth preferred embodiment, the pads each have an adhesive provided thereon for adhesively coupling the pads to the vertical supporting surface.

The case is preferably positioned on the back face of the wall hanging such that the lower edge of the case and the bottom edge of the wall hanging generally lie in a common plane with one another. With reference to FIG. 3, the case has an elongate slot extending along the lower edge of the case between the side edges of the case for providing an opening into the case. The case has a pair of shoulders 29,30 extending from the side edges of the case into the elongate slot of the case.

A generally rectangular panel 31 is slidably inserted into the case through the elongate slot of the case. The panel has substantially planar front and back faces, substantially straight top and bottom edges, and a pair of substantially straight side edges extending between the top and bottom edges of the panel. The top and bottom edges of the panel are extended substantially parallel to one another and the side edges of the panel are extended substantially parallel to one another and substantially perpendicular to the top and bottom edges of the panel. The top and bottom edges of the panel are extended substantially parallel to the upper and lower edges of the case while the side edges of the panel are extended substantially parallel to the side edges of the case and substantially perpendicular to the upper and lower edges of the case.

The panel has an opposite pair of outwardly extending upper side flanges 32,33 adjacent the top edge of the panel.

One of the upper side flanges of the panel is outwardly extended from one of the side edges of the panel. The other upper side flange of the panel is outwardly extended from the other side edge of the panel. The shoulders of the case define a width therebetween and the side edges of the panel also define a width therebetween. The width between the side edges of the panel is slightly less than the width between the shoulders of the case. The upper side flanges of the panel also define a width therebetween. The width between the upper side flanges of the panel is greater than the width of between the shoulders of the case so that the upper side flanges abut against the shoulders of the case when the panel is slid out of the case to prevent the panel from completely exiting the case.

The panel also has a generally lower flange 34 at the bottom edge. The lower flange of the panel has a pair of opposite ends 35,36 and a pair of sides 37,38 extending between the ends of the lower flange of the panel. The lower flange of the panel lies in a plane extending substantially perpendicular to the front and back faces of the panel. One of the ends of the lower flange is outwardly extended from one of the side edges of the panel and the other end of the lower flange is extended from the other side edge of the panel. One of the sides of the lower flange is outwardly extended from the front face of the panel and the other side of the lower flange is outwardly extended from the back face of the panel. Preferably, the one end of the lower flange and one of the side edges of the case lie in a common vertical plane with one another and the other end of the lower flange and the other side edge of the case lie in a common vertical plane with one another. Also preferably, the side of the lower flange outwardly extending from the back face of the panel and the back face of the case lie in a common plane with one another. In one preferred embodiment, the side of the lower flange outwardly extending from the front face of the panel and the front face of the case lie in a common plane with one another. In another preferred embodiment, as illustrated in FIG. 4, the side of the lower flange outwardly extending from the front face of the panel is outwardly extended from a plane in which the front face of the case lies. In use, the side of the lower flange outwardly extending from the front face of the panel is positioned beneath the bottom edge of the wall hanging.

In use, the panel is slidable in the elongate slot of the case between a retracted position (FIG. 4) and an extended position (FIG. 3). When the panel is positioned in the retracted position, the lower flange is positioned adjacent the lower edge of the case such that the lower flange abuts the lower edge of the case. When the panel is positioned in the extended position, the lower flange is spaced apart below from the lower edge of the case such that a portion of the panel adjacent the bottom edge of the panel extends below the bottom edge of the wall hanging. The upper side flanges of the panel abut the shoulders of the case when the panel is positioned in the extended position.

Preferably, the panel has an outwardly biased spring latch 39 on one of the sides edges of the panel retractably inserted into a corresponding depression 40 in the shoulder of the case adjacent the one side edge of the panel when the panel is positioned in the retracted position for releasably holding panel to the case with the panel is positioned in the retracted position.

The front face of the panel has a bubble vial 41 for determining whether the wall hanging is horizontal. Preferably, the bubble vial is flush with the front face of the panel. The bubble vial has a longitudinal axis extending substantially parallel to the top and bottom edges of the panel and substantially parallel to the bottom edge of the wall hanging. The bubble vial is positioned on the front face of the panel in the portion of the panel positioned below the bottom edge of the wall hanging when the panel is positioned in the extended position to permit a user to view the bubble vial to determine whether the wall hanging is horizontal.

As to a further discussion of the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

We claim:

1. A level for mounting to a wall hanging mounted to a vertical supporting surface to determine whether the wall hanging is horizontal, said level comprising:

a case having front and back faces, upper and lower edges, and a pair of side edges extending between said upper and lower edges of said case;

said case having an elongate slot extending along said lower edge of said case between said side edges of said case;

said case having a pair of shoulders extending from said side edges of said case into said elongate slot of said case;

a panel having front and back faces, top and bottom edges, and a pair of side edges extending between said top and bottom edges of said panel;

said top edge of said panel being slidably inserted into said elongate slot of said case;

said panel having an opposite pair of outwardly extending upper side flanges, one of said upper side flanges of said panel being outwardly extended from one of said side edges of said panel, the other upper side flange of said panel being outwardly extended from the other side edge of said panel;

said panel having a generally lower flange at said bottom edge; and said front face of said panel having a bubble vial;

said lower flange of said panel having a pair of opposite ends and a pair of sides extending between said ends of said lower flange of said panel, said lower flange of said panel lying in a plane extending substantially perpendicular to said front and back faces of said panel, one of said ends of said lower flange being outwardly extended from one of said side edges of said panel, the other end of said lower flange being extended from the other side edge of said panel, one of said sides of said lower flange being outwardly extended from said front face of said panel, the other side of said lower flange being outwardly extended from said back face of said panel; and wherein the one end of said lower flange and one of said side edges of said case lie in a common plane with one another, and the other end of said lower flange and the other side edge of said case lie in a common plane with one another.

2. The level of claim 1, further comprising a hook and loop fastener being provided on said front face of said case for attaching said front face to a wall hanging.

3. The level of claim 1, further comprising a spaced apart pair of pads being coupled to said back face of said case.

4. The level of claim 3, wherein said pads each comprise a resiliently deformable material.

5. The level of claim 3, wherein said pads each comprise magnetic material.

6. A leveling system, comprising:

a vertical supporting surface;

a wall hanging being mounted to the vertical supporting surface, said wall hanging being generally rectangular and having a generally rectangular outer perimeter, and front and back faces;

the back face of the wall hanging being substantially planar;

the outer perimeter of the wall hanging comprising substantially straight top and bottom edges and a pair of substantially straight side edges extending between the top and bottom edges of the wall hanging;

the top and bottom edges of the wall hanging being extended substantially parallel to one another, the side edges of the wall hanging being extended substantially parallel to one another and substantially perpendicular to the top and bottom edges of the wall hanging;

the wall hanging having a frame extending around the outer perimeter of the wall hanging;

a generally rectangular case having substantially planar front and back faces, substantially straight upper and lower edges, and a pair of substantially straight side edges extending between said upper and lower edges of said case;

said front and back faces of said case lying in substantially parallel planes to one another;

said upper and lower edges of said case being extended substantially parallel to one another, said side edges of said case being extended substantially parallel to one another and substantially perpendicular to said upper and lower edges of said case;

said case having a height defined between said upper and lower edges of said case, a width defined between said side edges of said case and a thickness defined between said front and back faces of said case;

said front face of said case being coupled to the back face of the wall hanging towards the bottom edge of the wall hanging such that said case is positioned between the wall hanging and the vertical supporting surface;

wherein said front face of said case is coupled to the back face of the wall hanging at a portion of the frame of the wall hanging located along the bottom edge of the wall hanging;

wherein a hook and loop fastener couples said front face of said case to the back face of the wall hanging;

said hook and loop fastener having a pair of complementary portions attachable to one another, one of said complementary portions of said hook and loop fastener being provided on a generally rectangular elongate patch on said front face of said case having a longitudinal axis extending between said side edges of said case substantially parallel to said upper and lower edges of said case;

the other of said complementary portions of said hook and loop fastener being provided on the back face of the wall hanging at the portion of the frame of the wall hanging along the bottom edge of the wall hanging;

a spaced apart pair of generally disk-shaped pads being coupled to said back face of said case;

said pads abutting the vertical supporting surface;

said lower edge of said case and the bottom edge of the wall hanging generally lying in a common plane with one another;

said case having an elongate slot extending along said lower edge of said case between said side edges of said case;

said case having a pair of shoulders extending from said side edges of said case into said elongate slot of s aid case;

a generally rectangular panel having substantially planar front and back faces, substantially straight top and bottom edges, and a pair of substantially straight side edges extending between said top and bottom edges of said panel;

said top and bottom edges of said panel being extended substantially parallel to one another, said side edges of said panel being extended substantially parallel to one another and substantially perpendicular to said top and bottom edges of said panel;

said top edge of said panel being slidably inserted into said elongate slot of said case;

said top and bottom edges of said panel being extended substantially parallel to said upper and lower edges of said case;

said side edges of said panel being extended substantially parallel to said side edges of said case and substantially perpendicular to said upper and lower edges of said case;

said panel having an opposite pair of outwardly extending upper side flanges adjacent said top edge of said panel, one of said up per side flanges of said panel being outwardly extended from one of said side edges of said panel, the other upper side flange of said panel being outwardly extended from the other side edge of said panel;

said shoulders of said case defining a width therebetween, said side edges of said panel defining a width therebetween, said width between said side edges of said panel being less than said width between said shoulders of said case;

said upper side flanges of said panel defining a width therebetween, said width between said upper side flanges of said panel being greater than said width of between said shoulders of said case;

said panel having a generally lower flange at said bottom edge, said lower flange of said panel having a pair of opposite ends and a pair of sides extending between said ends of said lower flange of said panel;

said lower flange of said panel lying in a plane extending substantially perpendicular to said front and back faces of said panel;

one of said ends of said lower flange being outwardly extended from one of said side edges of said panel, the other end of said lower flange being extended from the other side edge of said panel;

one of said sides of said lower flange being outwardly extended from said front face of said panel, the other side of said lower flange being outwardly extended from said back face of said panel;

the one end of said lower flange and one of said side edges of said case lying in a common plane with one another, the other end of said lower flange and the other side edge of said case lying in a common plane with one another;

said side of said lower flange outwardly extending from said back face of said panel and said back face of said case lying in a common plane with one another;

said side of said lower flange outwardly extending from said front face of said panel being outwardly extended from a plane in which said front face of said case lies;

said side of said lower flange outwardly extending from said front face of said panel being positioned beneath the bottom edge of the wall hanging;

said panel being slidable in said elongate slot of said case between a retracted position and an extended position;

said lower flange being positioned adjacent said lower edge of said case when said panel is positioned in said retracted position such that said lower flange abuts said lower edge of said case;

said lower flange being spaced apart from said lower edge of said case when said panel is positioned in said extended position such that a portion of said panel adjacent said bottom edge of said panel extends below the bottom edge of the wall hanging, said upper side flanges of said panel abutting said shoulders of said case when said panel is positioned in said extended position;

said panel having a spring latch on one of said sides edges of said panel retractably inserted into a depression in the shoulder of said case adjacent said one side edge of said panel when said panel is positioned in said retracted position for releasably holding panel to said case with said panel is positioned in said retracted position;

said front face of said panel having a bubble vial, said bubble vial having a longitudinal axis extending substantially parallel to said top and bottom edges of said panel and substantially parallel to the bottom edge of the wall hanging; and said bubble vial being positioned on said front face of said panel in said portion of said panel positioned below the bottom edge of the wall hanging when said panel is positioned in said extended position.

7. A level for mounting to a wall hanging mounted to a vertical supporting surface to determine whether the wall hanging is horizontal, said level comprising:

a case having front and back faces, upper and lower edges, and a pair of side edges extending between said upper and lower edges of said case;

said case having an elongate slot extending along said lower edge of said case between said side edges of said case;

said case having a pair of shoulders extending from said side edges of said case into said elongate slot of said case;

a panel having front and back faces, top and bottom edges, and a pair of side edges extending between said top and bottom edges of said panel;

said top edge of said panel being slidably inserted into said elongate slot of said case;

said panel having an opposite pair of outwardly extending upper side flanges, one of said upper side flanges of said panel being outwardly extended from one of said side edges of said panel, the other upper side flange of said panel being outwardly extended from the other side edge of said panel;

said panel having a generally lower flange at said bottom edge;

said front face of said panel having a bubble vial; and wherein the one end of said lower flange and one of said side edges of said case lie in a common plane with one another, and the other end of said lower flange and the other side edge of said case lie in a common plane with one another.

8. The level of claim 7, further comprising a hook and loop fastener being provided on said front face of said case for attaching said front face to a wall hanging.

9. The level of claim 7, further comprising a spaced apart pair of pads being coupled to said back face of said case.

10. The level of claim 9, wherein said pads each comprise a resiliently deformable material.

11. The level of claim 9, wherein said pads each comprise magnetic material.

* * * * *